Oct. 16, 1923. 1,470,718
A. E. FORSYTH
GEAR
Original Filed Feb. 7, 1921
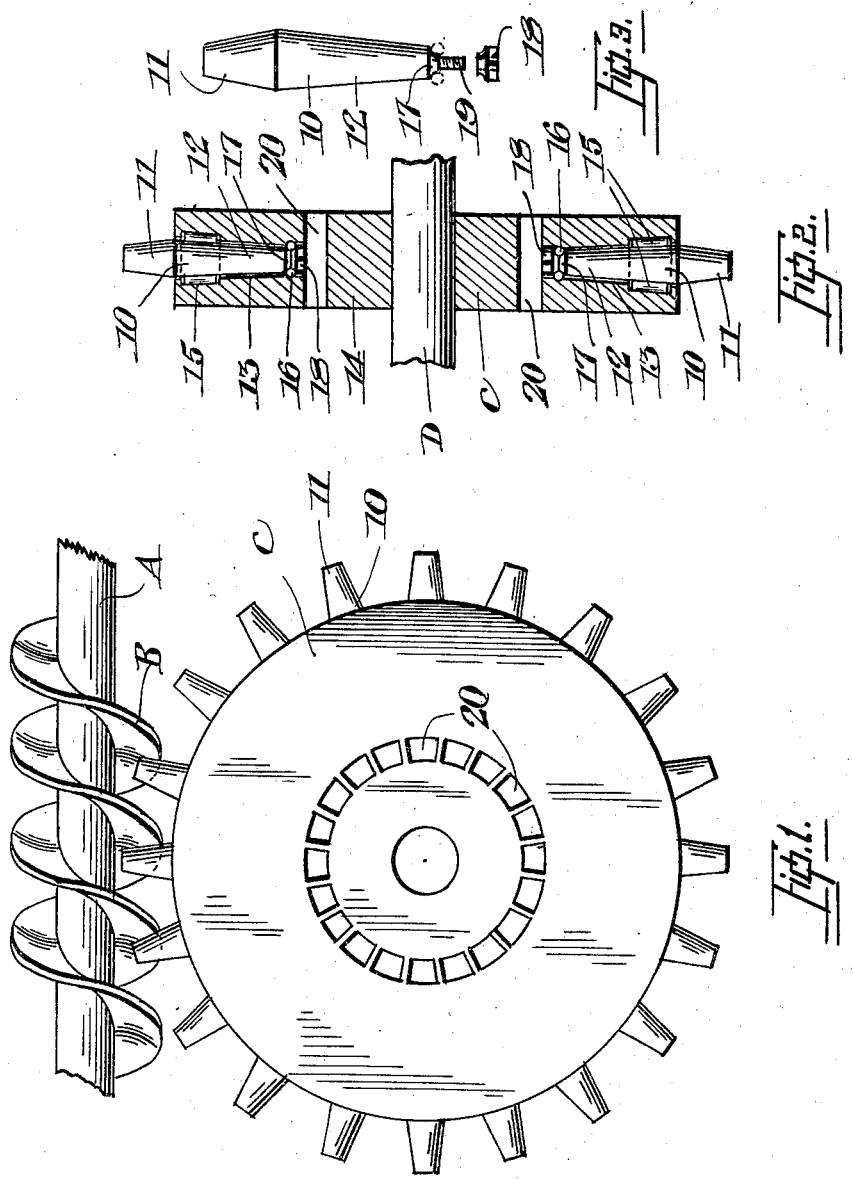
INVENTOR
ALBERT E. FORSYTH
BY *Fetherstonhaugh & Co'y*
ATTYS.

Patented Oct. 16, 1923.

1,470,718

UNITED STATES PATENT OFFICE.

ALBERT EDWIN FORSYTH, OF GREENBUSH, ONTARIO, CANADA.

GEAR.

Application filed February 7, 1921, Serial No. 443,048. Renewed April 12, 1923.

*To all whom it may concern:*

Be it known that I, ALBERT EDWIN FORSYTH, a subject of the King of Great Britain, and resident of the village of Greenbush, in the Province of Ontario, Dominion of Canada, have invented certain new and useful Improvements in Gears, of which the following is a specification.

This invention relates to improvements in gears, especially of a worm type, and the objects are to reduce friction in the transmission of power, and generally to improve and simplify the construction of the device to enable the working parts to better perform the functions required of them; and it consists essentially of the improved construction hereinafter described in detail in the accompanying specification and drawings.

In the drawings:

Figure 1 is a side elevation of an embodiment of the invention.

Figure 2 is a cross sectional view.

Figure 3 is a detailed plan of one of the teeth of the gear.

In the drawings like characters of reference indicate corresponding parts in all the figures.

Referring to the drawings:

A indicates a shaft having a worm B thereon; C indicates a gear having a plurality of teeth 10 adapted to engage with the worm. In accordance with the present invention, these teeth are adapted to turn on a radial axis, being supported in position by roller and ball bearings.

It will be seen that each of the teeth 10 is formed of two frusto-conical portions 11 and 12, the inner portion 12 being relatively longer than the portion 11, and being adapted to fit closely into the radially extending slightly conical recesses 13 formed in the body 14 of the gear C, the friction being reduced by means of a roller bearing 15 engaging the side of the tooth and a ball bearing 16 engaging a suitable groove 17 in the end of the same, the balls being retained in position by means of a nut 18 which fits on a threaded pin 19 formed at the end of the teeth 10.

The inner edge of each of the recesses 13 communicates with a transverse passageway 20, which extends to opposite sides of the gear and affords a passageway for the circulation of any liquid in case the gear is operated in a liquid. As the gear is operated in air, it enables the passage of the same through the passageways 20 and 13 to cool the teeth. The gear C may be mounted on a suitable shaft D.

As many changes could be made in the above construction, and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

A gear of the character described, comprising a worm, a gear having a plurality of radial recesses therein, connecting with transverse passageways, teeth in the recesses, each tooth being formed of two frustrum conical portions, the inner portion of which is relatively longer than the outer portion and said portions being tapered continuously from their outer ends to their point of juncture, roller bearings engaging the side of the teeth, and ball bearings supporting the ends of the teeth.

In witness whereof I have hereunto set my hand in the presence of two witnesses.

ALBERT EDWIN FORSYTH.

Witnesses:
WALTER DAVID SEGRAVE THOMAS,
NATHAN DELBERT McVEIGH.